(12) United States Patent
Venkataraman et al.

(10) Patent No.: US 7,947,775 B2
(45) Date of Patent: May 24, 2011

(54) FLUOROPOLYMER BLENDING PROCESS

(75) Inventors: Sundar Kilnagar Venkataraman, Avondale, PA (US); Ralph Munson Aten, Chadds Ford, PA (US); Heidi Elizabeth Burch, Parkersburg, WV (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 12/568,795

(22) Filed: Sep. 29, 2009

(65) Prior Publication Data
US 2010/0022713 A1  Jan. 28, 2010

Related U.S. Application Data

(63) Continuation of application No. 11/601,365, filed on Nov. 16, 2006, now abandoned.

(60) Provisional application No. 60/737,950, filed on Nov. 18, 2005.

(51) Int. Cl.
C08J 3/12 (2006.01)
C08F 259/08 (2006.01)
C08L 27/18 (2006.01)

(52) U.S. Cl. ........ 524/501; 525/200; 525/151; 525/153; 525/199; 524/502; 524/545; 524/544; 524/546

(58) Field of Classification Search .................. 525/200, 525/151, 199, 153; 524/501, 502, 544, 545, 524/546
See application file for complete search history.

(56) References Cited

U.S. PATENT DOCUMENTS

| | | | |
|---|---|---|---|
| 2,685,707 A | 8/1954 | Llewellyn et al. | |
| 3,142,665 A | 7/1964 | Cardinal et al. | |
| 3,819,594 A | 6/1974 | Holmes et al. | |
| 4,036,802 A | 7/1977 | Poirier | |
| 4,380,618 A | 4/1983 | Khan et al. | |
| 4,722,122 A | 2/1988 | Overbay | |
| 4,914,158 A * | 4/1990 | Yoshimura et al. | 525/199 |
| 4,952,630 A | 8/1990 | Morgan et al. | |
| 5,324,785 A | 6/1994 | Noda et al. | |
| 5,494,752 A | 2/1996 | Shimizu et al. | |
| 5,677,404 A | 10/1997 | Blair | |
| 5,684,088 A * | 11/1997 | Miyamori et al. | 525/64 |
| 5,707,763 A * | 1/1998 | Shimizu et al. | 429/217 |
| 5,708,131 A | 1/1998 | Morgan | |
| 5,780,552 A * | 7/1998 | Kerbow | 525/276 |
| 5,932,673 A | 8/1999 | Aten et al. | |
| 6,429,258 B1 | 8/2002 | Morgan et al. | |
| 6,462,109 B1 * | 10/2002 | Sharma et al. | 523/501 |
| 6,583,226 B1 | 6/2003 | Kaulbach et al. | |
| 6,737,165 B1 | 5/2004 | Smith et al. | |
| 6,780,363 B2 * | 8/2004 | Palamone et al. | 264/219 |
| 6,841,594 B2 | 1/2005 | Jones et al. | |
| 6,870,020 B2 | 3/2005 | Aten et al. | |
| 7,414,084 B2 * | 8/2008 | Yamaguchi et al. | 523/201 |
| 7,462,667 B2 * | 12/2008 | Dadalas et al. | 524/544 |
| 7,763,680 B2 * | 7/2010 | Aten et al. | 525/199 |
| 2003/0162923 A1 | 8/2003 | Funaki et al. | |
| 2003/0204011 A1 * | 10/2003 | Bladel et al. | 524/515 |
| 2004/0143052 A1 * | 7/2004 | Epsch et al. | 524/544 |
| 2004/0242783 A1 * | 12/2004 | Yabu et al. | 525/199 |
| 2005/0187328 A1 | 8/2005 | Globus et al. | |
| 2006/0142468 A1 * | 6/2006 | Downing et al. | 524/544 |
| 2007/0106027 A1 * | 5/2007 | Namura | 525/199 |
| 2007/0117929 A1 * | 5/2007 | Burch et al. | 525/199 |
| 2007/0117930 A1 | 5/2007 | Venkataraman et al. | |
| 2007/0117935 A1 * | 5/2007 | Aten et al. | 525/242 |
| 2010/0113702 A1 * | 5/2010 | Burch et al. | 525/190 |

FOREIGN PATENT DOCUMENTS

| | | |
|---|---|---|
| EP | 0 221 554 A2 | 5/1987 |
| EP | 0 322 877 A2 | 7/1989 |
| EP | 0 481 509 A2 | 4/1992 |
| EP | 0 606 493 A1 | 7/1994 |
| EP | 0 735 093 A1 | 10/1996 |
| WO | WO 03/022923 * | 3/2003 |

OTHER PUBLICATIONS

Ebnesajjad, (Fluoroplastics, vol. 2—Melt Processible Fluoropolymers, William Andrew Publishing/Plastics Design Library; 2003.*
Tervoort et al., Macromolecules, 2000, 33, 6460-6465.*
Cogswell, F. N., "Polymer Melt Rheology, A Guide for Industrial Practice", Published by Woodhead Publishing, 1996, p. 31.

* cited by examiner

Primary Examiner — Vasu Jagannathan
Assistant Examiner — Mark S Kaucher

(57) ABSTRACT

Aqueous dispersions on non-melt flowable PTFE and melt-fabricable perfluoropolymer are mixed together, followed by recovery of the resultant mixture of the dispersed particles of each of these polymers, and melt mixing of the resultant mixture of particles to obtain a blend in which the PTFE particles form the disperse phase and the perfluoropolymer forms the continuous phase, the melt mixing producing advantageous melt viscosities and the blend exhibiting advantageous physical properties even at high PTFE contents of about 30 wt %.

12 Claims, No Drawings

FLUOROPOLYMER BLENDING PROCESS

BACKGROUND OF THE INVENTION

1. Field of the Invention

This invention relates to the blending together of polytetrafluoroethylene and melt-fabricable perfluoropolymer.

2. Description of Related Art

US 2004/0242783 A1 discloses a blend of tetrafluoroethylene/hexafluoropropylene copolymer, commonly called FEP, and polytetrafluoroethylene (PTFE), the PTFE imparting the improved extrusion property of reduced cone breaks during melt draw down extrusion coating of wire. The FEP composition by itself is selected to provide good crack resistance for molded articles, and the PTFE has a high enough molecular weight so that the molded article does not have poor crack resistance. The PTFE content of the blend is disclosed to be 0.03 to 2 parts by weight based on 100 parts by weight of the copolymer. When the amount of PTFE is more than 2 parts by weight, two disadvantageous results are disclosed: the melt viscosity of the blend increases significantly and the molded article tends to become brittle The FEP and PTFE are blended together by melt kneading. Before kneading, the copolymer and PTFE can be pre-mixed to improve the degree of dispersion of the PTFE [0042]. In Example 1, powders of the PTFE and copolymer are mixed together, followed by kneading in a twin-screw extruder to produce molding pellets, which are then melt-extruded, using a single screw extruder, as a coating onto wire. The PTFE powder has an average particle size of 450 micrometers. The particle size of the copolymer is not disclosed in Example 1, but the aqueous emulsion polymerization to obtain this copolymer is disclosed. The copolymer is recovered from emulsion polymerization by coagulation, which provides a dry powder particles having an average size about the same as the PTFE powder.

SUMMARY OF THE INVENTION

It has been discovered that much greater proportions of PTFE can be blended not only with FEP but with melt-fabricable perfluoropolymers in general without the resultant blend losing its melt fabricability and without causing articles molded from the resultant melt blend to be brittle. The only limitation on the greater proportion of PTFE that can be incorporated into the blend is that the PTFE is the disperse phase in the melt blend and the melt-fabricable perfluoropolymer is the continuous phase.

The present invention can be described as the process for melt fabricating perfluoropolymer, comprising forming a mixture of submicrometer-size particles of both non-melt-flowable polytetrafluoroethylene (PTFE) and melt-fabricable perfluoropolymer, melt blending said mixture to form a dispersion of said particles of non-melt flowable PTFE in a continuous phase of said melt-fabricable perfluoropolymer, and molding the resultant melt blend into an article. Preferably, the non-melt flowable PTFE constitutes at least about 0.1 wt %, preferably at least about 0.5 wt %, based on the combined weight of the non-melt flowable PTFE and melt-fabricable perfluoropolymer to obtain appreciable advantage from the PTFE component. Good physical properties can exist when the non-melt flowable PTFE constitutes up to about 75 wt % based on the aforesaid combined weight. This composition and others disclosed herein for use in the present invention apply both to the mixture of polymer particles and to the melt blend, wherein the melt fabricable perfluoropolymer is the continuous phase and therefore is no longer in particulate form. The composition used to form the mixture is considered to be the same as the composition of the melt blend and thus of the article molded therefrom.

In a preferred embodiment, the forming of the mixture of submicrometer-size particles is done by mixing together an aqueous dispersion of submicrometer-size particles comprising the PTFE and an aqueous dispersion of submicrometer-size particles comprising the melt-fabricable perfluoropolymer and separating the resultant mixture of said submicron particles from the resultant mixture of said aqueous dispersions, i.e. from the aqueous media of the combined dispersions. The separation step is conveniently carried out by co-coagulating the mixed-together aqueous dispersions and drying the resultant mixture of submicrometer-size particles. The mixture of submicrometer-size particles remains after the separation step. If co-coagulation of the mixed dispersions is used as the separation step, the resultant agglomerates contain particles of both polymers, i.e. particles of both polymers are agglomerated together. Upon drying, the agglomerates become a powder, which is typically referred to as secondary particles and which upon melt mixing, disperses the primary particles of the non-melt flowable PTFE into the continuous phase of the melt-fabricable perfluoropolymer formed during the melt mixing. The 450 micrometer average particle size for the PTFE of Example 1 of US 2004/0242783 A1 is a typical secondary particle size. In the melt mixing, the PTFE particles retain their particulate identity, while the perfluoropolymer particles melt and flow together to lose their particulate identity, to form the continuous phase of the melt blend. The continuous phase being the melt flowable perfluoropolymer is confirmed by the melt fabricability of the melt mixed composition. Articles molded from the composition are transparent to translucent, rather than opaque as are articles molded from PTFE.

The melt fabrication process of the present invention preferably starts with the mixing together of the primary dispersion-polymerized particles of the two polymers. In contrast, US 2004/0242783 A1, practices the mixing together of secondary particles of each polymer. The kneading in a twin screw extruder as required in '783 is not required in the present invention. Melt blending can be carried out in a single screw extruder that would be used for extrusion or for polymer melting in injection molding. The significance of the difference between these procedures is the ability to incorporate a greater proportion of the PTFE into the melt blend with the perfluoropolymer to obtain surprisingly advantageous results. This is true even for PTFE contents of at least about 4 wt % based on combined weight non-melt flowable PTFE and melt-fabricable perfluoropolymer.

With respect to melt properties, the melt blend produced in accordance with the present invention is thixotropic, i.e. the melt viscosity of the blend decreases (becomes more fluid) with increasing shear. In this regard, the mixture of submicrometer-size particles of non-melt-flowable PTFE and melt-fabricable perfluoropolymer is preferably characterized by a reduction in melt viscosity upon increasing shear rate from about $10 \, s^{-1}$ to about $100 \, s^{-1}$ that is at least about 10% greater than the reduction in melt viscosity at the same shear rates for the melt-fabricable perfluoropolymer by itself, as determined by the capillary rheometer method described hereinafter.

With respect to physical properties, the absence of brittleness in articles melt fabricated in accordance with the present invention is indicated preferably by the mixture of submicrometer-size particles of non-melt-flowable PTFE and melt-fabricable perfluoropolymer being characterized by an elongation at break of at least about 200%, preferably at least 250%, as determined by tensile testing in accordance with ASTM D 638-03 as further described hereinafter. More preferably the elongation at break is at least 75% of that of the melt-fabricable perfluoropolymer by itself, more preferably at least 85% thereof. As determined by the same ASTM test, the tensile strength of the mixture is preferably at least about 75% of that of the melt-fabricable perfluoropolymer by itself, more preferably at least about 85% thereof. As shown in the Examples, mixtures containing much greater amounts of the PTFE component than 2 parts by weight of PTFE/100 parts of the FEP exhibit elongation at break and/or tensile strength that is at least as high as that for the perfluoropolymer composition by itself.

Contrary to the expectation from US 2004/0242783 A1, these thixotropy and elongation attributes exist for compositions containing at least about 4 wt % of the PTFE component, based on combined weight as described above, as well as for lesser amounts, e.g. as little as 0.5 wt % PTFE. The maximum amount of PTFE in the composition at which these attributes will exist will depend on the particular melt-fabricable perfluoropolymer, and will extend up to at least about 15 wt % of the PTFE component, more preferably up to about at least about 25 wt %, and most preferably, at up to least about 30 wt % of the PTFE component, based on combined weight.

DETAILED DESCRIPTION OF THE INVENTION

The present invention starts with creating a mixture of the two components: submicrometer-size particles of non-melt flowable PTFE and submicrometer-size particles of melt-fabricable perfluoropolymer.

With respect to the non-melt flowable PTFE component, the non-melt flowability aspect of the PTFE can also be characterized by high melt creep viscosity, sometimes called specific melt viscosity, which involves the measurement of the rate of elongation of a molten sliver of PTFE under a known tensile stress for 30 min., as further described in and determined in accordance with U.S. Pat. No. 6,841,594, referring to the specific melt viscosity measurement procedure of U.S. Pat. No. 3,819,594. In this test, the molten sliver is maintained under load for 30 min, before the measurement of melt creep viscosity is begun, and this measurement is then made during the next 30 minutes of applied load. The PTFE preferably has a melt creep viscosity of at least about $1\times10^6$ Pa·s, more preferably at least about $1\times10^7$ Pa·s, and most preferably at least about $1\times10^8$ Pa·s, all at 380° C. This temperature is well above the first and second melt temperatures of PTFE of 343° C. and 327° C., respectively. The difference between non-melt flowability of the PTFE core and the melt flowability of the melt-fabricable perfluoropolymer shell is apparent from the melt flow rate (MFR) test procedure of ASTM D1238-94a. In this procedure, the MFR is the rate in g/10 min at which perfluoropolymer flows through a defined orifice under a specified load at a specified temperature, usually 372° C. Since the PTFE used in the present invention has no melt flow in general and when subjected to the procedure of ASTM D1238-94a, has a zero MFR, the melt characteristic of the PTFE is not determined by this ASTM procedure. The high melt creep viscosity of the PTFE present in the core of the core/shell polymer also means that the PTFE is sinterable, i.e. a molded article, unsupported by the mold (free-standing), of the PTFE can be heated above the melting point of the PTFE to coalesce the PTFE particles together without the molded article flowing to lose its shape. The PTFE used in the present invention is also often characterized by standard specific gravity (SSG), which is the ratio of weight in air of a PTFE specimen prepared in a specified manner to an equal volume of water at 23° C. as further described in U.S. Pat. No. 4,036,802 and ASTM D 4894-94. The lower the SSG, the higher the molecular weight of the PTFE. The specimen preparation procedure as disclosed in ASTM D-4894-94 includes compression molding the test specimen, removing the compression molded test specimen from the mold, and sintering the specimen in air, i.e. free standing, at 380° C. The non-melt flowability of the PTFE enables this sintering to be carried out without the test specimen losing its compression molded shape and dimensions.

The PTFE can be the granular type or the fine powder type, made by suspension or aqueous dispersion polymerization, respectively. The PTFE can be homopolymer of tetrafluoroethylene or a copolymer thereof with a small amount of comonomer, such as hexafluoropropylene or perfluoro(alkyl vinyl ether) wherein the alkyl group contains 1 to 5 carbon atoms, that improves the sinterability of the TFE, to obtain such improvement as reduced permeability and greater flex life, as compared to the TFE homopolymer. This type of PTFE is sometimes referred to as modified PTFE. Examples of modified PTFE are disclosed in U.S. Pat. Nos. 3,142,665, 3,819,594, and 6,870,020. For simplicity and because the modified PTFE exhibits the same non-melt flow, high melt creep viscosity of PTFE homopolymer, this type of PTFE is included in the term polytetrafluoroethylene or PTFE used herein.

The non-melt flowable PTFE used in the present invention is to be distinguished from low molecular weight PTFE, which because of its low molecular weight has melt flowability but not melt-fabricability. This melt flowable PTFE, which has an MFR that is measurable by ASTM D 1238-94a, is obtained by direct polymerization under conditions that prevent very long polymer chains from forming, or by irradiation degradation of non-melt flowable PTFE. Such melt flowable PTFE is commonly called PTFE micropowder. It is not considered as being melt fabricable because the article molded from the melt is useless, by virtue of extreme brittleness. Because of its low molecular weight (relative to non-melt-flowable PTFE), it has no strength. An extruded filament of the PTFE micropowder is so brittle that it breaks upon flexing.

With respect to the perfluoropolymer component of the mixture used in the present invention, as indicated by the prefix "per" in perfluoropolymer, the monovalent atoms bonded to the carbon atoms making up the polymer are all fluorine atoms. Other atoms may be present in the polymer end groups, i.e. the groups that terminate the polymer chain. The perfluoropolymer is a perfluoroplastic, not a perfluoroelastomer. The melt flow rate (MFR) of the perfluoropolymers used in the present invention can vary widely, depending on the proportion of non-melt flowable PTFE component, the melt-fabrication technique desired for the mixture of polymer components, and the properties desired in the melt-fabricated article. Thus, MFRs for the melt-fabricable fluoropolymer can be in the range of about 0.1 to 500 g/10 min, but will usually be preferred as about 0.5 to 100 g/10 min, and more preferably 0.5 to 50 g/10 min., as measured according to ASTM D-1238-94a and following the detailed conditions disclosed in U.S. Pat. No. 4,952,630, at the temperature which is standard for the resin (see for example ASTM D 2116-91a and ASTM D 3307-93 that are applicable to the most common melt-fabricable fluoropolymers, both specifying 372° C. as the resin melt temperature in the Plastometer®). The amount of polymer extruded from the Plastometer® in a measured amount of time is reported in units of g/10 min in accordance with Table 2 of ASTM D 1238-94a. The higher the MFR of the perfluoropolymer, the greater is the tendency to generate smoke when the polymer is subjected to the NFPA-255 burn test, thus failing such test. The perfluoropolymer component can have high MFR, e.g. greater than 20 g/10 min, without the article melt-fabricated from the polymer mixture used in the present invention failing the NFPA-255 burn test, because the presence of the PTFE component as dispersed particles in the continuous phase of melt-fabricable perfluoropolymer making up the molded article does not flow, and thus, does not drip to cause smoke generation.

Examples of perfluoropolymers that can be used in the polymer mixture used in the present invention include the copolymers of tetrafluoroethylene (TFE) with one or more polymerizable perfluorinated comonomers, such as perfluoroolefin having 3 to 8 carbon atoms, such as hexafluoropropylene (HFP), and/or perfluoro(alkyl vinyl ether) (PAVE) in which the linear or branched alkyl group contains 1 to 5 carbon atoms. Preferred PAVE monomers include perfluoro(methyl vinyl ether) (PMVE), perfluoro(ethyl vinyl ether) (PEVE), perfluoro(propyl vinyl ether) (PPVE), and perfluoro (butyl vinyl ether) (PBVE). The copolymer can be made using several PAVE monomers, such as the TFE/perfluoro(methyl vinyl ether)/perfluoro(propyl vinyl ether) copolymer, sometimes called MFA by the manufacturer. The preferred perfluoropolymers are TFE/HFP copolymer in which the HFP content is about 5-17 wt %, more preferably TFE/HFP/PAVE such as PEVE or PPVE, wherein the HFP content is about 5-17 wt % and the PAVE content, preferably PEVE, is about 0.2 to 4 wt %, the balance being TFE, to total 100 wt % for the copolymer. The TFE/HFP copolymers, whether or not a third comonomer is present, are commonly known as FEP. TFE/PAVE copolymers, generally known as PFA, have at least about 2 wt % PAVE, including when the PAVE is PPVE or PEVE, and will typically contain about 2-15 wt % PAVE. When PAVE includes PMVE, the composition is about 0.5-13 wt % perfluoro(methyl vinyl ether) and about 0.5 to 3 wt % PPVE, the remainder to total 100 wt % being TFE, and as stated above, may be referred to as MFA. The low melt viscosity of these copolymers relative to the high melt creep viscosity of the PTFE, provides the melt flowability to the perfluoropolymer for its melt fabricability, and the perfluoropolymer composition itself provides the strength required for the practical utility of the article melt fabricated from the perfluoropolymer. The melt flow difference between the melt-fabricable perfluoropolymer being characterizable by melt viscosity and MFR and the non-melt flowable PTFE being characterizable by melt creep viscosity and SSG is great as indicated by the inability of the melt-fabricable perfluoropolymer to be characterizable by melt creep viscosity or by SSG. The melt-fabricable perfluoropolymer cannot be characterized by either melt creep viscosity or by SSG. In the melt creep viscosity test, the sliver of molten perfluoropolymer melts, flows, and breaks during the 30 minutes initial heating under load at 380° C., so there is no sliver remaining for the melt creep determination during the second 30 minutes of heating. In the SSG test, the specimen melts and flows during the 380° C. heating (sintering for non-melt flowable PTFE), undermining the integrity of the specimen for the SSG determination. Of course, the non-melt flowability of the PTFE used in the present invention, enables either of the melt creep viscosity or SSG determinations to be made on such PTFE.

The perfluoroolefin or PAVE comonomer composition of the perfluoropolymer component is determined by infrared analysis on compression molded film made from the perfluoropolymer particles in accordance with the procedures disclosed in U.S. Pat. No. 4,380,618 for the particular fluoromonomers (HFP and PPVE) disclosed therein. The analysis procedure for other fluoromonomers are disclosed in the literature on polymers containing such other fluoromonomers. For example, the infrared analysis for PEVE is disclosed in U.S. Pat. No. 5,677,404.

The combination of the non-melt flowable PTFE and melt fabricable perfluoropolymer components (submicrometer-size particles) used in the present invention results in a polymer mixture that is also melt fabricable. One attribute of melt flowability, enabling melt fabricability, is that the polymer mixture used the present invention exhibits a melt viscosity of preferably no more than about $5 \times 10^5$ Pa·s, more preferably, no more than about $1 \times 10^5$ Pa·s, and most preferably, no more than about $5 \times 10^4$ Pa·s, all at a shear rate of 100 s$^{-1}$ and melt temperature in the range of about 350° C. to 400° C. The determination of melt viscosities disclosed herein, unless otherwise indicated, is by dividing shear stress applied to the polymer melt by shear rate applied to the polymer melt as disclosed on p. 31 of F. N. Cogswell, *Polymer Melt Rheology. A Guide for Industrial Practice*, published by Woodhead Publishing (1996). As a practical matter, the equivalent melt viscosities are obtained simply by readout from the computer accompanying the rheometer used to determine shear rate and shear stress. The melt viscosity of the melt-fabricable perfluoropolymer by itself is such that the above mentioned melt viscosities for the polymer mixture are obtained. The melt viscosity of the perfluoropolymer component by itself can also be characterized by the above mentioned melt viscosities.

As discussed above, the melt fabricability of the perfluoropolymer component can be characterized by its MFR. Although the presence of the non-melt flowable PTFE component may lower the MFR of the overall melt blend of the polymers as compared to the MFR of the perfluoropolymer by itself, and may even render the MFR not measurable by ASTM D 1238-94a, the thixotropy exhibited by the polymer blend when subjected to sufficient shear in the molten state, enables the resultant melt blend to be melt fabricated into articles by the typical melt fabrication techniques of extrusion and injection molding. The melt viscosity of the polymer blend, as discussed above, reflects the thixotropic effect, because of its determination at a much higher shear rate than is encountered in the MFR determination. The thixotropic effect extends over the entire range of polymer mixture compositions. At least about 0.5 wt % of the PTFE component is required before the thixotropic effect is appreciable. The maximum amount of PTFE component is preferably up to that amount beyond which the PTFE is no longer the dispersed phase when the polymer mixture is melt mixed (blended), such as occurs in extrusion or injection molding. Preferably the reduction in viscosity is at least about 100%, and more preferably at least about 500% greater than the viscosity reduction for the perfluoropolymer by itself when the shear rate is increased from about 10 s$^{-1}$ to about 100 s$^{-1}$. These shear rates are expressed in terms of "about", because of limitations in the operation of the rheometer used to measure them. The rheometer includes a variable speed piston that provides the volumetric flow rate (Q) of molten polymer through the rheometer orifice and various orifice sizes, the selection of which provides the radius r in the equation: shear rate ($\gamma$)=$4Q/\pi r^3$. With particular rheometers it may be difficult to adjust the piston speed and orifice size such that the exact shear rates of 10 s$^{-1}$ and 100 s$^{-1}$ are obtained. The shear rates used in the Examples were 11.9 s$^{-1}$ and 101 s$^{-1}$. Typically, the rheometer can be operated so that the shear rates are 10 s$^{-1}$±3 s$^{-1}$ and 100 s$^{-1}$±5 s$^{-1}$. In absolute terms, the preferred reduction in melt viscosity by the polymer mixture used in the present invention is at least about 200 Pa·s, more preferably at least about 400 Pa·s at the shear rates specified above.

The advantage of thixotropy discovered by the present invention extends to higher shear rates than $100\ s^{-1}$ enabling the polymer mixture to be extruded at a faster rate by melt-draw down extrusion than the melt-fabricable perfluoropolymer by itself. Alternatively, the melt cone formed in melt-draw-down extrusion can have a lower draw-down ratio (DDR) than the usual DDR of 80 to 100:1, to improve concentricity of the wall thickness of the extrudate, applied for example as jacketing on FEP insulated communications cable, especially such cable used in plenums of buildings. DDR is the ratio of the cross-sectional area of the annular die opening to the cross-sectional area of the final shape and size of the extrudate, e.g. the plenum cable jacket just described.

Within the above composition range, various improvements in physical properties exist. Preferably, the non-melt flowable PTFE content is about 4 to 40 wt % based on the combined weight of the non-melt flowable PTFE and melt-fabricable perfluoropolymer and more preferably about 4 to 30 wt % as the PTFE content. As the PTFE wt % increases from 2 wt % based on the combined weight of these polymer components, the elongation and tensile strength increase, indicating reinforcement of the perfluoropolymer continuous phase by the dispersed PTFE particles. This reinforcement extends to much greater amounts of PTFE component, e.g. up to at least about 15 wt % of the PTFE, more preferably up to about 25, and most preferably up to about 30 wt % of the PTFE, 4 wt % of the PTFE component being the preferred minimum, all percents being based on the combined weight of the PTFE and the perfluoropolymer components. Alternatively, either the perfluoropolymer component or its MFR can be selected to optimize melt flow either for high production rate melt fabrication or the production of intricate molded shapes, while still retaining adequate physical properties for the particular utility intended. For example, the elongation at break of the polymer mixture is preferably at least 200% for compositions containing up to at least about 30 wt % of the PTFE component, based on the combined weight of the PTFE and perfluoropolymer components. As shown in one of the Examples, the elongation of at least 200% can exist for compositions containing up to about 75 wt % of the PTFE component.

The process of the present invention can also be characterized by the novel properties obtained by the melt blending of a mixture of molten polymer particles together. Thus, the process for melt fabricating perfluoropolymer comprises forming a mixture of submicrometer-size particles of non-melt-flowable polytetrafluoroethylene and melt-fabricable perfluoropolymer, melt blending said mixture, and molding the resultant melt blend into an article, said mixture of submicrometer-size particles of non-melt-flowable polytetrafluoroethylene and melt-fabricable perfluoropolymer being characterized by elongation of at least 75% of that of the perfluoropolymer by itself and/or viscosity reduction of at least 10% greater than for the perfluoropolymer by itself, when shear is increased from about $10\ s^{-1}$ to $100\ s^{-1}$ when said polytetrafluoroethylene constitutes at least 4 wt % of the combined weight of said polytetrafluoroethylene and said perfluoropolymer. The preferred minimum thixotropy effects (viscosity reductions) described above also apply to this embodiment and to compositions wherein the PTFE component constitutes up to at least 15 wt %, preferably at least 25 wt % and more preferably at least 30 wt %, based on the combined weight of the PTFE and perfluoropolymer components.

Another embodiment of the present invention is the molded article obtained by any of the processes of the present invention disclosed herein.

Each of the PTFE and perfluoropolymer components used in the present invention are preferably made by aqueous dispersion polymerization and each aqueous dispersion polymerization can be done by conventional, known methods.

In one embodiment of the present invention, the PTFE component is prepared as an aqueous dispersion-produced core/shell polymer wherein the PTFE is the core and the shell is melt-fabricable perfluoropolymer. At least a portion, if not all, of the melt-fabricable perfluoropolymer is supplied to the polymer mixture as the shell of the core/shell polymer. The remaining portion to arrive at the perfluoropolymer amount desired in the PTFE/perfluoropolymer mixture for melt blending may be separately supplied melt-fabricable perfluoropolymer. Alternatively, submicrometer-size PTFE particles can be separately supplied to the polymer mixture to increase its PTFE content. The resultant melt blend causes the melt-fabricable perfluoropolymer from the shell of the core/shell polymer to melt mix with the separately supplied melt-fabricable perfluoropolymer to become indistinguishable as they form together the continuous phase for the dispersed particles of non-melt flowable PTFE. The independently supplied melt-fabricable perfluoropolymer should be compatible with the perfluoropolymer of the shell of the core/shell polymer. By compatible is meant that the melt-fabricable perfluoropolymers become indistinguishable in melt mixing and cooling in forming the continuous phase as described above. Preferably the monomers making up the melt-fabricable perfluoropolymer of the shell and the independently supplied perfluoropolymer are either the same or in the homologous series. The shell perfluoropolymer and the independently supplied perfluoropolymer are considered to be the same even though there may be small differences in concentration of the same perfluoromonomer and/or difference in MFR as occurs from small differences in the polymerization process producing the shell polymer as compared to producing the perfluoropolymer by itself. This provides the indistinguishability of the shell perfluoropolymer and independently supplied perfluoropolymer resulting from melt mixing to form the continuous phase of the blend. The most common melt-fabricable perfluoropolymers, FEP and PFA are incompatible with one another, one indicia of which is that magnified frozen (that is non-molten) cross-sections of the cooled melt blend reveal domains of each perfluoropolymer being present when viewed under polarized light.

In the preparation of core/shell polymer, the non-melt flowable PTFE core can be prepared in a polymerization that is separate from the polymerization forming the shell melt-fabricable perfluoropolymer, and this core is used to seed the polymerization of the perfluoromonomers forming the melt-fabricable perfluoropolymer shell onto the core. In another embodiment, the core is formed in situ, followed by the polymerization to form the shell on the core. In this embodiment, the non-melt flowable PTFE core is formed by polymerization of TFE. Then the TFE feed to the polymerization reactor is stopped. The polymerization reaction is allowed to complete itself, and the transition to the copolymerization to form the shell polymer will depend on the copolymerization system being used. For example, the TFE remaining in the reactor can be permitted either to be consumed by the PTFE polymerization or to be vented off, and in either case, the copolymerization system for the shell polymer is then established. Alternatively, the copolymerization system for the shell polymer is established while maintaining the TFE concentration in the reactor constant. Then the copolymerization to form the shell is started. Addition of the comonomer along with additional TFE to the reactor will depend on the comonomer. When the comonomer is HFP, the total amount will typically be added at the commencement of the copolymerization reaction. When the comonomer is PAVE, it too may be added at the commencement of the copolymerization reaction or co-fed to the reactor with the TFE feed to the copolymerization reaction. These addition techniques can be used when just the perfluoropolymer by itself is being made. Agitation of the aqueous medium and initiator addition may be stopped when the initial charge of comonomer is fed to the reactor to avoid premature coagulation of the PTFE core in core/shell polymerization. The copolymerization to form the shell is carried out to obtain the relative amount of shell polymer desired and particle size of the core/shell polymer.

The core/shell polymer if used to provide all or a portion of the melt-fabricable perfluoropolymer to the polymer mixture is preferably formed by first forming the core in situ, followed by the copolymerization to form the shell. This provides a better integration of the shell with the core, by chemical bonding between the core and the shell, wherein the shell copolymer acts as a compatibilizing agent with other melt-fabricable perfluoropolymer (from other core/shell polymer particles or from independently supplied melt-fabricable perfluoropolymer), enabling the matrix of the blend to be formed and the PTFE core particles to become dispersed without causing disruptions within the matrix that would detract from physical properties.

The polymerization to form the non-melt flowable PTFE core, whether by seed polymerization by suspension or aqueous dispersion polymerization or in situ is conventional polymerization to form the non-melt flowable PTFE. The polymerization to form the shell is also conventional aqueous dispersion polymerization.

Examples of initiators that can be used in both polymerizations and in polymerization of the PTFE and perfluoropolymer components by themselves, all aqueous dispersion polymerizations, include ammonium persulfate, potassium persulfate, bis(perfluoroalkane carboxylic acid) peroxide, azo compounds, permanganate system, and disuccinic acid peroxide. Examples of dispersing agents used in the aqueous dispersion polymerizations include ammonium perfluorooctanoic and perfluoroalkyl ethane sulfonic acid salts, such as the ammonium salt.

A typical aqueous dispersion polymerization process as known in the art involves the steps of precharging an aqueous medium to a stirred autoclave, deoxygenating, pressurizing with TFE to predetermined level, adding modifying comonomer if desired, agitating, bringing the system to desired temperature, e.g., 60°-100° C., introducing initiator, adding more TFE according to predetermined basis, and regulating temperature and pressure. Initiator addition, at a fixed or variable rate, may continue throughout the batch or only for part of the batch. Recipe and operating parameters not fixed by the equipment are commonly selected in order that temperature is maintained approximately constant throughout the polymerization. This same general procedure is followed for polymerizing the perfluoromonomers to make the melt-fabricable perfluoropolymer, except that the polymerization temperature and order of addition of the TFE and the other perfluoromonomer will depend on the identity of the additional perfluoromonomer. Examples of general procedures for making melt-fabricable perfluoropolymer are disclosed in U.S. Pat. No. 5,677,404(FEP) and U.S. Pat. No. 5,932,673 (PFA).

The particle size of the core/shell polymer or PTFE or perfluoropolymer by itself is small enough (submicrometer in size) that the polymer particles remain dispersed in the aqueous polymerization medium until the polymerization reaction is completed, whereupon the dispersed polymer particles can be intentionally coagulated, by such conventional means as increased agitation from the agitation applied during polymerization or by addition of electrolyte. Alternatively, the coagulation can be done by freeze/thaw method such as disclosed in U.S. Pat. No. 5,708,131 (Morgan). The coagulation is preferably a co-coagulation of mixed together aqueous dispersions of the polymers used to form the polymer mixture staring material for the process of the present invention, as will be further described below.

Typically, the average as-polymerized polymer particle size (diameter), referred to as RDPS (raw dispersion particle size) in the Examples, will be less than one micrometer (submicrometer-size) as determined by the laser light scattering method of ASTM D4464. Preferably the average polymer particle size is less than about 0.5 micrometer, more preferably less than about 0.3 micrometer, and even more preferably, less than about 0.25 micrometer and most preferably less than about 0.2 micrometer. These particle sizes apply to the PTFE and perfluoropolymer particles and to the core/shell polymer particles if used, to form the starting polymer mixture in the process of the present invention. The submicrometer size of the core/shell polymer establishes that both the core and the shell are submicrometer in size. The smaller the average polymer particle size, the more stable the aqueous dispersion of the polymer particles, enabling the polymerization to be carried out to higher polymer solids content before stopping the polymerization and carrying out coagulation. The particle size of the PTFE component incorporated into the melt blend from the polymer mixture is understood to be the size of the particles of PTFE in the melt blend and articles melt-fabricated from the melt blend, because of the non-melt flowability of the PTFE. The core/shell polymer provides submicrometer-size particles of both the PTFE as the core and the melt-fabricable perfluoropolymer as the shell. A single core/shell polymer particle is a mini-mixture of these polymer components. A multiplicity of core/shell polymer particles forms a mixture of submicrometer-size particles, which is also a mixture of the PTFE and melt-fabricable perfluoropolymer components.

The as-polymerized polymer particle sizes described in the aqueous dispersions above are the primary particles (sizes) of the polymer. Coagulation of the aqueous dispersion of the core/shell primary particles and co-coagulation of the mixed together separately prepared aqueous dispersions of PTFE particles and particles of melt-fabricable perfluoropolymer causes these particles to agglomerate together, which upon drying become a fine powder mixture of these polymer particles, the agglomerated mixture having an average particle size depending on the method of coagulation, but of at least about 300 micrometers, as determined by the dry-sieve analysis disclosed in U.S. Pat. No. 4,722,122. The agglomerates of primary particles and thus the particles of the fine powder are often referred as secondary particles.

Preferably, the separately prepared aqueous dispersions of the PTFE and perfluoropolymer components, or core/shell polymer and perfluoropolymer components, as the case may be, are mixed together to obtain mixture of the submicrometer-size polymer particles still in aqueous dispersion form. When core/shell polymer is not used, then all of the melt-fabricable perfluoropolymer is separately supplied from the PTFE component. Co-coagulation of the mixed dispersions results in the formation of agglomerates, which contain primary particles of each polymer component intermixed with one another. The agglomerates can be separated from the aqueous medium by decanting, with or without filtration, followed by drying to form the fine powder, called secondary particles as described above. Typically, the polymer mixture used as the starting material in the process of the present invention will be a mixture of fine powder, the particles of fine powder each containing primary particles of both polymer components.

For convenience, this fine powder can be subjected to melt extrusion, involving melt blending of the mixture, to form pellets as an intermediate molded article for further melt fabrication. Alternatively, the first exposure of the polymer mixture can be part of the melt fabrication process to form the final article, such as extruded wire insulation, cable jacket, or injection molded article. In either case, the melt blending involves the formation of a molten mass of polymer and mixing this mass together as part of the melting process. Typically, this melt blending will be carried out at a temperature above the melting temperature of the PTFE, and thus above the melting temperature of the melt-fabricable perfluoropolymer, whether the melting temperature of the PTFE is the first melt temperature (about 343° C.) or second melt temperature (about 327° C.) of the PTFE, e.g. at a melt temperature of at least 350° C. As described above, the melt blend becomes a dispersion of the PTFE component in a continuous phase of the perfluoropolymer component, and this dispersion relationship is carried over into the article molded from the melt blend, and if the molded article is pellets, then into the final article melt fabricated from the pellets.

EXAMPLES

Test Procedures

The procedures for determining melt creep viscosity, standard specific gravity (SSG), melt flow rate (MFR), and average polymer particle size (RDPS) reported in the Examples are disclosed earlier herein. The determination of melt viscosity is also disclosed earlier herein. All of the polymer blends disclosed in the Examples exhibited a melt viscosity less than about $5 \times 10^4$ Pa·s at 350° C. and shear rate of 101 s$^{-1}$.

The thixotropy of the melt blends described in the Examples is determined by capillary rheometry method of ASTM D 3835-02 in which the melt temperature of the polymer in the rheometer is 350° C. This method involves the extrusion of molten polymer through the barrel of a Kayeness® capillary rheometer at a controlled rate to obtain the shear rate desired. The results are reported in the Examples as melt viscosity change (reduction), $\Delta\eta$ in Pa·s in increasing the shear rate on the molten polymer from 11.9 s$^{-1}$ to 101 s$^{-1}$. The determination of melt viscosity using the rheometer has been discussed hereinbefore. The melt viscosities are determined at the two shear rates, and the viscosity difference is determined by subtracting the melt viscosity at 101 s$^{-1}$ from the melt viscosity at 11.9 s$^{-1}$.

The elongation at break and tensile strength parameters disclosed hereinbefore and values reported in the Examples are obtained from the mixture of PTFE and melt-fabricable perfluoropolymer components by the procedure of ASTM D 638-03 on dumbbell-shaped test specimens formed from the mixture, 15 mm wide by 38 mm long and having a web width of 5 mm, stamped out from 60 mil (1.5 mm) thick compression molded plaques of the mixture.

The compression molding of the plaques used in these tests was carried out on fine powder under a force of 20,000 lbs (9070 kg) at a temperature of 350° C. to make 6×6 in (15.2× 15.2 cm) compression moldings. In greater detail, to make the 60 mil thick plaque, the fine powder was added in an overflow amount to a chase which was 55 mil (1.4 mm) thick. The chase defines the 6×6 in sample size. To avoid sticking to the platens of the compression molding press, the chase and fine powder filling are sandwiched between two sheets of aluminum foil. The press platens are heated to 350° C. This sandwich is first pressed for 5 min at about 200 lb (91 kg) to melt the fine powder and cause it to coalesce, followed by pressing at 10,000 lb (4535 kg) for 2 min, followed by 20,000 lb (9070 kg) for 2 min, followed by release of the pressing force, removal of the compression molding from the chase and sheets of aluminum foil, and quenching in air, the plaque being under a weight to prevent warping. Compression molding of the core/shell polymer coagulated and fine powder produces the dispersion of the PTFE core in a continuous matrix of the shell perfluoropolymer. The compression molding is necessary to give the test specimen strength. If the powder were merely coalesced by heating at the temperature of the compression molding, to simulate the fusing of a coating, the resultant coalesced article would have little strength.

The procedure for measuring MIT Flex Life is disclosed at ASTM D 2176 using a 8 mil (0.21 mm) thick compression molded film. The disclosures of the MIT Flex Life parameter and values herein are with reference to and are obtained using a 0.21 mm thick compression molded film, unless otherwise indicated.

Preparation of Polymer Components

Polymer A (FEP)

A cylindrical, horizontal, water-jacketed, paddle-stirred, stainless steel reactor having a length to diameter ratio of about 1.5 and a water capacity of 10 gallons (37.9 L) was charged with 50 pounds (22.7 kg) of demineralized water and 330 mL of a 20 wt % solution of ammonium perfluorooctanoate surfactant in water. With the reactor paddle agitated at 46 rpm, the reactor was heated to 60° C., evacuated and purged three times with tetrafluoroethylene (TFE). The reactor temperature then was increased to 103° C. After the temperature had become steady at 103° C., HFP was added slowly to the reactor until the pressure was 444 psig (3.1 MPa). Ninety-two milliliters of liquid PEVE was injected into the reactor. Then TFE was added to the reactor to achieve a final pressure of 645 psig (4.52 MPa). Forty milliliters of freshly prepared aqueous initiator solution containing 1.04 wt % of ammonium persulfate (APS) and 0.94 wt % potassium persulfate (KPS) was charged into the reactor. Then, this same initiator solution was pumped into the reactor at 10 mL/min for the remainder of the polymerization. After polymerization had begun as indicated by a 10 psig (0.07 MPa) drop in reactor pressure, additional TFE was added to the reactor at a rate of 24.5 lb (11.1 kg)/125 min until a total of 24.5 lbs (11.1 kg) of TFE had been added to the reactor after kickoff. Furthermore, liquid PEVE was added at a rate of 1.0 mL/min for the duration of the reaction. The total reaction time was 125 min after initiation of polymerization. At the end of the reaction period, the TFE feed, PEVE feed, and the initiator feed were stopped, and the reactor was cooled while maintaining agitation. When the temperature of the reactor contents reached 90° C., the reactor was slowly vented. After venting to nearly atmospheric pressure, the reactor was purged with nitrogen to remove residual monomer. Upon further cooling, the dispersion was discharged from the reactor at below 70° C. Solids content of the dispersion was 36.81 wt % and raw dispersion particle size (RDPS) was 0.167 µm. A portion of the dispersion was coagulated to produce material for testing. After coagulation, the polymer was isolated by filtering and then drying in a 150° C. convection air oven. This polymer was stabilized by heating at 260° C. for 1.5 hr in humid air containing 13 mol % water. The TFE/HFP/PEVE terpolymer (FEP) had a melt flow rate (MFR) of 37.4 g/10 min, an HFP content of 10.5 wt %, a PEVE content of 1.26 wt %, and a melting point of 260° C. For this material, the viscosity change (reduction), $\Delta\eta$, was 101 Pa·s. The FEP exhibited a tensile strength and elongation at break of 2971 psi (20.8 MPa) and 310%, respectively. This FEP is a typical high-performing FEP.

Polymer B (PTFE Micropowder)

A cylindrical, horizontal, water-jacketed, paddle-stirred, stainless steel reactor having a length to diameter ratio of about 1.5 and a water capacity of 10 gallons (37.9 L) was charged with 50 lbs (22.7 kg) of demineralized water, 200 mL of 20 wt % ammonium perfluorooctanoate in water, and 2.0 g Krytox® 157 FSL (available from E.I. du Pont de Nemours & Co., Inc.). With the reactor paddle agitated at 70 rpm, the reactor was heated to 60° C., evacuated and purged three times with tetrafluoroethylene (TFE). The reactor and its contents were cooled to 25° C. and ethane was added to achieve a pressure change of 27 in Hg (91 kPa). The temperature of the reactor and its contents were increased to 90° C. After the temperature had become steady at 90° C., tetrafluoroethylene (TFE) was added to the reactor until the pressure was 250 psig (1.72 MPa). Then 90 mL of freshly prepared aqueous initiator solution containing 1.0 wt % of ammonium persulfate (APS) was charged into the reactor. Then, this same initiator solution was pumped into the reactor at 10 mL/min for 70 minutes. After polymerization had begun as indicated by a 10 psig (0.07 MPa) drop in reactor pressure, additional TFE was added to the reactor at a rate of 26 lb (11.8 kg)/110 min until a total of 26.0 lbs (11.8 kg) of TFE had been added to the reactor after kickoff. The total reaction time was 110 min after initiation of polymerization. At the end of the reaction period, the TFE feed was stopped, and the TFE remaining in the reactor was allowed to react down to a pressure of 35 psig (0.24 MPa). When the reactor pressure reached 35 psig, the reactor was slowly vented. After venting to atmospheric pressure, the contents of the reactor were cooled and the dispersion was discharged from the reactor at below 70° C. Solids content of the dispersion was 36.32 wt % and raw dispersion particle size (RDPS) was 0.110 µm. A portion of the dispersion was coagulated to produce material for testing. The polymer was isolated by filtering and then drying in a 150° C. convection air oven. This material had a melt flow rate (MFR) of 2.15 g/10 min using the procedure of ASTM D 1238-94a, except that the diameter of the extrusion orifice was 0.031 inch (0.79 mm) instead of the usual 0.082 in (2.09 mm). The fact that this PTFE exhibited an MFR means that this PTFE was melt flowable.

Polymer C (Non-Melt Flowable PTFE)

A cylindrical, horizontal, water-jacketed, paddle-stirred, stainless steel reactor having a length to diameter ratio of about 1.5 and a water capacity of 10 gallons (37.9 L) was charged with 19.5 kg of demineralized water, 600 grams of paraffin wax, 60 ml of a 20 wt % solution of ammonium perfluorooctanoate dispersant (C-8), 10 ml of a 2 wt % oxalic acid solution, and 1 gram succinic acid. With the reactor paddle agitated at 46 rpm, the reactor was heated to 65° C., evacuated and purged three times with tetrafluoroethylene (TFE). The reactor temperature then was increased to 80° C. After the temperature was steady at 80° C., TFE was added slowly to the reactor until the pressure was 2.75 MPa. Then 245 mL of freshly prepared aqueous initiator solution containing 0.015% $KMnO_4$ and 0.007% ammonium phosphate in water were added to the reactor at the rate of 80 ml/min. Then, this same initiator solution was pumped into the reactor at 5 mL/min. TFE was added at a rate sufficient to maintain the pressure at 2.75 MPa. After 7.0 kg of TFE was added following initial pressurizing with TFE, initiator solution addition was stopped. The polymerization time to the stopping of initiator addition was 57 min. After a total of 12.6 kg of TFE had been added after initial pressure up, the TFE and the C-8 solution feeds were stopped and the reactor was vented. The length of the reaction, measured from the start of the first initiator injection to the termination of TFE feed, was 183 min. The contents were discharged from the reactor and the supernatant wax was removed. Solids content of the raw dispersion was 39.3 wt % and RDPS was 289 nm. A portion of the dispersion was diluted to 11 wt % solids and coagulated in the presence of ammonium carbonate under vigorous agitation conditions. The coagulated dispersion (fine powder) was separated from the liquid and dried in an air oven at 150° C. for three days. The PTFE resin had SSG of 2.159 and a melt creep viscosity of at least $1 \times 10^{11}$ Pa·s at 380° C., which is the upper limit of measurement, indicating ultra-high molecular weight, and a zero MFR.

Polymer D (Non-Melt Flowable Modified PTFE)

A cylindrical, horizontal, water-jacketed, paddle-stirred, stainless steel reactor having a length to diameter ratio of about 1.5 and a water capacity of 10 gallons (37.9 L) was charged with 19.5 kg of demineralized water, 709 grams of paraffin wax, 3.13 mL of a 20 wt % solution of ammonium perfluorooctanoate dispersant (C-8), 98 mL of a 0.1 wt % solution of $FeCl_2.4H_2O$ in water, and 101 mL of a 0.1 wt % solution of $CuCl_2.2H_2O$ in water. With the reactor paddle agitated at 46 rpm, the reactor was heated to 65° C., evacuated and purged three times with tetrafluoroethylene (TFE). The reactor temperature then was increased to 91° C. After the temperature was steady at 91° C., 520 mL of a 2 wt % solution of disuccinyl peroxide in water was injected as rapidly as possible. Then, 29.5 mL of hexafluoropropylene (HFP) was injected before the pressure of the reactor was raised to 350 psig using TFE. After polymerization had begun, as indicated by a 15 psig (0.07 MPa) drop in reactor pressure, additional TFE was added to the reactor at a rate of 0.3 lb/min (0.14 kg/min) and the temperature of the reactor and its contents were increased to 93° C. After 1.5 lbs (0.68 kg) of TFE had reacted, a 2 wt % aqueous solution of ammonium perfluorooctanoate was added at a rate of 40 mL/min for the remainder of the reaction. After 29.6 lbs (13.4 kg) of TFE had been consumed, the reaction was terminated by stopping the TFE and the C-8 solution feeds, and the contents of the reactor were allowed to continue to react until the reactor pressure reached 175 psig (1.20 MPa). The length of the reaction, measured as time during which TFE was being fed, was approximately 31 minutes. The contents were discharged from the reactor and the supernatant wax was removed. Solids content of the raw dispersion was 42.3 wt % and RDPS was 205 nm. A portion of the dispersion was diluted to 11 wt % solids and coagulated in the presence of ammonium carbonate under vigorous agitation conditions. The coagulated dispersion (fine powder) was separated from the liquid and dried in an air oven at 150° C. for three days. The PTFE resin has SSG of 2.186, melt creep viscosity of $4 \times 10^9$ Pa·s at 380° C., an HFP content of 0.45 wt %, and a zero MFR.

Polymer E (PFA)

A cylindrical, horizontal, water-jacketed, paddle-stirred, stainless steel reactor having a length to diameter ratio of about 1.5 and a water capacity of 10 gallons (37.9 L) was charged with 54 pounds (24.5 kg) of demineralized water, 5.0 g Krytox® 157 FSL (available from E.I. du Pont de Nemours and Co., Inc.), and 240 mL 20 wt % solution of ammonium perfluorooctanoate surfactant in water. With the reactor paddle agitated at 50 rpm, the reactor was evacuated and purged three times with tetrafluoroethylene (TFE). Ethane was added to the reactor until the pressure was 8 in Hg (3.93 psig, $2.71 \times 10^{-2}$ MPa), then 200 mL of perfluoro(propyl vinyl ether) (PPVE) were added. The reactor temperature then was increased to 75° C. After the temperature had become steady at 75° C., TFE was added to the reactor to achieve a final pressure of 250 psig (1.75 MPa). An aliquot of 400 mL of a freshly prepared aqueous initiator solution containing 0.2 wt % of ammonium persulfate (APS) was charged to the reactor. This same initiator solution was pumped into the reactor at 5 mL/min for the remainder of the batch. After polymerization had begun, as indicated by a 10 psig (0.07 MPa) drop in reactor pressure, additional TFE was added to the reactor at a rate of 0.167 lb/min (75.6 g/min) until a total of 20 lb (9080 g) of TFE had been added after kickoff. PPVE was added at 2.0 mL/min for the duration of the batch, 120 min. At the end of the reaction period, the TFE, PPVE, and initiator feeds were stopped and the reaction vessel was vented. When the reactor pressure reached 5 psig (0.035 MPa), the reactor was swept with nitrogen, then the reactor contents were cooled to 50° C. before the dispersion was discharged from the reactor. Solids content of the dispersion was 28.9 wt %, and the raw dispersion particle size (RDPS) was 0.130 μm. After coagulation, the polymer was isolated by filtering and then dried in a 150° C. convection air oven. This PPVE/TFE copolymer had a melt flow rate (MFR) of 8.2 g/10 min, a PPVE content of 3.66 wt %, melting points of 232 and 328° C., and an MIT flex life of 78583 cycles. The tensile strength of the PFA was 3502 psi (24.5 MPa) and the elongation at break was 292%. The viscosity change was 2658 Pa·s.

Polymer F (Non-Melt Flowable PTFE)

A cylindrical, horizontal, water-jacketed, paddle-stirred, stainless steel reactor having a length to diameter ratio of about 1.5 and a water capacity of 10 gallons (37.9 L) was charged with 50 pounds (22.7 kg) of demineralized water and 330 mL of a 20 wt % solution of ammonium perfluorooctanoate surfactant in water. With the reactor paddle agitated at 46 rpm, the reactor was heated to 60° C., evacuated and purged three times with tetrafluoroethylene (TFE). The reactor temperature then was increased to 103° C. After the temperature had become steady at 103° C., the pressure of the reactor was raised to 250 psig (1.75 MPa) using TFE. Fifty milliliters of an initiating solution consisting of 1.04 wt % APS and 0.94 wt % KPS in water was injected to the reactor, then this same initiator solution was added at 0.5 mL/min. After polymerization had begun as indicated by a 10 psig (0.07 MPa) drop in reactor pressure, additional TFE was added at 0.2 lb (90.8 g)/min for 7.5 min. After 1.5 lbs (681 g) of TFE fed after initiation, the TFE and initiator feeds were stopped and the reactor was vented. The contents of the reactor were cooled to 80° C. before being discharged. Solids content of the dispersion was 4.81 wt % and raw dispersion particle size (RDPS) was 0.138 μm. A portion of the dispersion was coagulated, then after coagulation, the polymer was isolated by filtering and then dried in a 150° C. convection air oven. The standard specific gravity (SSG) of the resulting PTFE homopolymer was 2.217. The results demonstrate that the polymer is non-melt flowable PTFE because it has a measurable SSG. The PTFE also exhibited a melt creep viscosity greater than $10^8$ Pa·s at 380° C. and a zero MFR.

Polymer G (Non-Melt Flowable PTFE)

A cylindrical, horizontal, water-jacketed, paddle-stirred, stainless steel reactor having a length to diameter ratio of about 1.5 and a water capacity of 10 gallons (37.9 L) was charged with 50 pounds (22.7 kg) of demineralized water, 330 mL of a 20 wt % solution of ammonium perfluorooctanoate surfactant in water, and 5.0 g Krytox® 157 FSL, available from E.I. du Pont de Nemours and Company, Inc. Krytox® 157 FSL is a perfluoropolyether carboxylic acid as further described in Table 1 of U.S. Pat. No. 6,429,258. With the reactor paddle agitated at 46 rpm, the reactor was heated to 60° C., evacuated and purged three times with tetrafluoroethylene (TFE). The reactor temperature then was increased to 103° C. After the temperature had become steady at 103° C., the pressure of the reactor was raised to 250 psig (1.75 MPa) using TFE. Fifty milliliters of an initiating solution consisting of 1.04 wt % APS and 0.94 wt % KPS in water was injected to the reactor, then this same initiator was added at 0.5 mL/min. After polymerization had begun as indicated by a 10 psig (0.07 MPa) drop in reactor pressure, additional TFE was added at 0.2 lb (90.8 g)/min for 7.5 min. After 1.5 lbs (681 g) of TFE fed after initiation, the TFE and initiator feeds were stopped and the reactor was vented. The contents of the reactor were cooled to 80° C. before being discharged. Solids content of the dispersion was 4.8 wt % and raw dispersion particle size (RDPS) was 0.008 μm. A portion of the polymer was coagulated, and after coagulation the polymer was isolated by filtering and then dried in a 150° C. convection air oven. The standard specific gravity (SSG) of the resulting PTFE homopolymer was 2.121. The PTFE also exhibited a melt creep viscosity greater than $10^8$ Pa·s at 380° C. and a zero MFR.

Polymer H (PFA)

This Example shows the copolymerization to make a typical high-performing PFA by itself for comparison with the core/shell polymer containing essentially the same PFA.

A cylindrical, horizontal, water-jacketed, paddle-stirred, stainless steel reactor having a length to diameter ratio of about 1.5 and a water capacity of 10 gallons (37.9 L) was charged with 54 pounds (24.5 kg) of demineralized water and 240 mL 20 wt % solution of ammonium perfluorooctanoate surfactant in water. With the reactor paddle agitated at 50 rpm, the reactor was evacuated and purged three times with tetrafluoroethylene (TFE). Ethane was added to the reactor until the pressure was 8 in Hg (3.93 psig, $2.71 \times 10^{-2}$ MPa), then 200 mL of perfluoro(ethyl vinyl ether) (PEVE) were added. The reactor temperature then was increased to 75° C. After the temperature had become steady at 75° C., TFE was added to the reactor to achieve a final pressure of 300 psig (2.07 MPa). An aliquot of 400 mL of a freshly prepared aqueous initiator solution containing 0.2 wt % of ammonium persulfate (APS) was charged to the reactor. This same initiator solution was pumped into the reactor at 5 mL/min for the remainder of the batch. After polymerization had begun, as indicated by a 10 psig (0.07 MPa) drop in reactor pressure, additional TFE was added to the reactor at a rate of 0.167 lb/min (75.6 g/min) until a total of 20 lb (9080 g) of TFE were added after kickoff. PEVE was added at 2.0 mL/min for the duration of the batch, 120 min. At the end of the reaction period, the TFE, PEVE, and initiator feeds were stopped and the reaction vessel was vented. Solids content of the dispersion was 29.7 wt %, and the raw dispersion particle size (RDPS) was 0.172 µm. After coagulation, the polymer was isolated by filtering and then dried in a 150° C. convection air oven. This PEVE/TFE copolymer had a melt flow rate (MFR) of 29.0 g/10 min, a PEVE content of 3.01 wt %, a melting point of 302° C., and an MIT flex life of 2463 cycles. The viscosity change was 111 Pa·s. The copolymer also exhibited a tensile strength of 3027 psi (21.2 MPa) and elongation at break of 349%.

Comparative Example A (Blend of FEP with PTFE Micropowder)

The aqueous dispersions of Polymer A and Polymer B were mixed together by rolling at a rate of 5-10 rpm for 10 minutes, resulting in an aqueous blend that was 90 wt % Polymer A and 10 wt % Polymer B on a dry solids basis. The polymer blend was isolated by freezing, filtering and then drying in a 150° C. convection air oven. This polymer was stabilized by heating at 260° C. for 1.5 hr in humid air containing 13 mol % water. The resulting blend had a melt flow rate of 56.4 g/10 min. For this blend, the viscosity change (reduction), $\Delta\eta$, was 108 Pa·s. The blend exhibited a tensile strength and elongation at break of 2661 psi (20.8 MPa) and 272%, respectively. The addition of 10 wt % of a low molecular weight, melt-flowable PTFE does not result in either the desired thixotropic behavior or any improvement in physical properties.

Comparative Example B (Blend of FEP with PTFE Micropowder)

The aqueous dispersions of Polymers A and B were mixed together by rolling at a rate of 5-10 rpm for 10 minutes, resulting in a blend that was 60 wt % Polymer A and 40 wt % Polymer B on a dry solids basis. The polymer blend was isolated by freezing, filtering and then drying in a 150° C. convection air oven. This polymer was stabilized by heating at 260° C. for 1.5 hr in humid air containing 13 mol % water. The resulting blend had a melt flow rate of 109.2 g/10 min. The blend exhibited a tensile strength and elongation at break of 2211 psi (15.24 MPa) and 12%, respectively. The addition of 40 wt % of a low molecular weight, melt flowable PTFE greatly embrittled the blend.

Example 1

Blend of FEP with Non-Melt Flowable PTFE

This Example describes the blending of FEP dispersion and ultra-high molecular weight PTFE (Polymer C). The aqueous dispersions of Polymers A and C were mixed together by rolling in a container at a rate of 5-10 rpm for 10 minutes, resulting in a blend that was 7 wt % Polymer C and 93 wt % Polymer A on a dry solids basis. The polymer blend was isolated by freezing, filtering, and then drying in a 150° C. convection air oven. This polymer was stabilized by heating at 260° C. for 1.5 hr in humid air containing 13 mol % water. The resulting blend had a melt flow rate of 0 g/10 min and viscosity change (reduction), $\Delta\eta$, of 6434 Pa·s. The blend also exhibited a tensile strength and elongation at break of 2676 psi (18.45 MPa) and 219%, respectively.

Example 2

Blend of FEP and Non-Melt Flowable PTFE

This Example describes the blending of FEP dispersion and high molecular weight PTFE (modified with HFP). Aqueous dispersions of Polymers A and D were mixed together by rolling at a rate of 5-10 rpm for 10 minutes, resulting in a blend that was 7 wt % Polymer D and 93 wt % Polymer A on a dry solids basis. The polymer blend was isolated by freezing, filtering, and then drying in a 150° C. convection air oven. This polymer was stabilized by heating at 260° C. for 1.5 hr in humid air containing 13 mol % water. The resulting blend had a melt flow rate of 7.5 g/10 min and exhibited a viscosity change (reduction), $\Delta\eta$, of 1404 Pa·s. The blend exhibited a tensile strength and elongation at break of 2844 psi (19.61 MPa) and 278%, respectively.

Example 3

Blend of FEP and Non-Melt Flowable PTFE

This Example describes the blending of FEP dispersion and small particle high molecular weight PTFE. Aqueous dispersions of Polymers A and F were mixed by rolling at a rate of 5-10 rpm for 10 minutes, resulting in a blend that was 7 wt % Polymer F and 93 wt % Polymer A on a dry solids basis. The polymer blend was isolated by freezing, filtering, and then drying in a 150° C. convection air oven. This polymer was stabilized by heating at 260° C. for 1.5 hr in humid air containing 13 mol % water. The resulting blend had a melt flow rate of 14.8 g/10 min and exhibited a viscosity change (reduction), $\Delta\eta$, of 756 Pa·s. The blend exhibited a tensile strength and elongation at break of 2997 psi (20.66 MPa) and 306%, respectively.

Example 4

Blend of FEP and Non-Melt Flowable PTFE

This Example describes the blending of FEP dispersion and very small particle size high molecular weight PTFE. Aqueous dispersions of Polymers A and G were mixed together by rolling at a rate of 5-10 rpm for 10 minutes, resulting in a blend that was 7 wt % Polymer G and 93 wt % Polymer A on a dry solids basis. The polymer blend was isolated by freezing, filtering, and then drying in a 150° C. convection air oven. This polymer was stabilized by heating at 260° C. for 1.5 hr in humid air containing 13 mol % water. The resulting blend had a melt flow rate of 14.8 g/10 min and exhibited a viscosity change (reduction), $\Delta\eta$, of 499 Pa·s. The blend exhibited a tensile strength and elongation at break of 2999 psi (20.68 MPa) and 321%, respectively.

Example 5

Blend of PFA and Non-Melt Flowable PTFE

This Example describes the blending of PFA dispersion and ultra-high molecular weight PTFE. Aqueous dispersions of Polymers E and C were mixed together by rolling at a rate of 5-10 rpm for 10 minutes, resulting in a blend that was 20 wt % Polymer C and 80 wt % Polymer E on a dry solids basis. The polymer blend was isolated by freezing, filtering, and then drying in a 150° C. convection air oven. The resulting blend had a melt flow rate of 1.0 g/10 min and exhibited a viscosity change (reduction) of at least 2 times that for the PFA by itself. The blend exhibited a tensile strength and elongation at break of 3672 psi (25.31 MPa) and 404%, respectively.

Example 6

Blend of PFA with Non-Melt Flowable PTFE

This Example describes the blending of PFA dispersion and high molecular weight PTFE, which contains HFP modifier. Aqueous dispersions of Polymers E and D were mixed together by rolling at a rate of 5-10 rpm for 10 minutes, resulting in a blend that was 20 wt % Polymer D and 80 wt % Polymer E on a dry solids basis. The polymer blend was isolated by freezing, filtering, and then drying in a 150° C. convection air oven. The resulting blend had a melt flow rate of 1.0 g/10 min and exhibited a viscosity change (reduction), Δη, of 14805 Pa·s. The blend exhibited a tensile strength and elongation at break of 3242 psi (22.35 MPa) and 311%, respectively.

Example 7

Blend of PFA and Non-Melt Flowable PTFE

This Example describes the blending of PFA dispersion and as-polymerized small particle PTFE. Aqueous dispersions of Polymers E and F were mixed together by rolling at a rate of 5-10 rpm for 10 minutes, resulting in a blend that was 20 wt % Polymer F and 80 wt % Polymer E on a dry solids basis. The polymer blend was isolated by freezing, filtering, and then drying in a 150° C. convection air oven. The resulting blend had a melt flow rate of 4.1 g/10 min and exhibited a viscosity change (reduction), Δη, of 5664 Pa·s. The blend exhibited a tensile strength and elongation at break of 3311 psi (22.83 MPa) and 376%, respectively.

Example 8

Blend of PFA and Non-Melt Flowable PTFE

This Example describes the blending of PFA dispersion and as-polymerized very small particle PTFE. Aqueous dispersions of Polymers E and G were mixed together by rolling at a rate of 5-10 rpm for 10 minutes, resulting in a blend that was 20 wt % Polymer G and 80 wt % Polymer E on a dry solids basis. The polymer blend was isolated by freezing, filtering, and then drying in a 150° C. convection air oven. The resulting blend had a melt flow rate of 2.0 g/10 min and exhibited a viscosity change (reduction), Δη, of 4797 Pa·s. The blend exhibited a tensile strength and elongation at break of 3693 psi (25.46 MPa) and 419%, respectively.

Examples 9-14

Core/Shell Polymer Wherein the Shell is FEP

Core/shell polymer when the shell polymer is FEP made in accordance with the process of Comparative Example A, and the proportion of core to shell is widely varied, is made in this Example. A cylindrical, horizontal, water-jacketed, paddle-stirred, stainless steel reactor having a length to diameter ratio of about 1.5 and a water capacity of 10 gallons (37.9 L) was charged with 50 pounds (22.7 kg) of demineralized water and 330 mL of a 20 wt % solution of ammonium perfluorooctanoate surfactant in water. With the reactor paddle agitated at 46 rpm, the reactor was heated to 60° C., evacuated and purged three times with tetrafluoroethylene (TFE). The reactor temperature then was increased to 103° C. After the temperature had become steady at 103° C., the pressure of the reactor was raised to 250 psig (1.75 MPa) using TFE. Fifty milliliters of an initiator solution consisting of 1.04 wt % APS and 0.94 wt % KPS in water was injected to the reactor, then this same initiator was added at 0.5 mL/min. After polymerization had begun as indicated by a 10 psig (70 kPa) drop in reactor pressure, additional TFE was added at 0.2 lb (90.7 g)/min for 10 min. After 2 lbs (9070 g) of TFE had been fed after polymerization began, the TFE feed was stopped, then the reactor contents were agitated for 10 minutes with the initiator still being fed. The agitator and initiator pumps were stopped, then 1280 mL of HFP were added to the reactor. Agitation was resumed and initiation was resumed using the same solution at a rate of 10 mL/min. The reactor pressure was raised to 600 psi (4.1 MPa) with TFE. An aliquot of 92 mL of PEVE was added to the reactor, then 1 mL/min PEVE and 0.2 lb (90.87 g)/min TFE were added over the remainder of the reaction. After an additional 20 lb (9070 g) of TFE were reacted, the PEVE injection was stopped. Two lbs (907 g) more of TFE were fed, for a total of 24 lb (10.9 kg) TFE for the batch, then the batch was terminated in a manner similar to Comparative Example A. Solids content of the dispersion of the resultant TFE/HFP/PEVE copolymer was 35.8 wt % and raw dispersion particle size (RDPS) was 0.246 μm. The polymer was finished in a manner similar to Comparative Example A. Details of the composition of this core/shell polymer and its properties are presented as Example 9 in Table 1 Examples 10 through 14 were prepared in a manner similar to Example 9, with the proportions of core and shell altered by changing the relative amounts of TFE fed during each phase of polymerization. Details are given in Table 1 below.

TABLE 1

| Ex. No. | PTFE Core, wt % | HFP Content, wt % | PEVE Content, wt % | HFP Content in Shell, wt % | PEVE Content in Shell, wt % | MFR, g/10 min | Tensile Strength, MPa | Elongation at Break, % | Δη, Pa·s |
|---|---|---|---|---|---|---|---|---|---|
| 9 | 7.6% | 6.84 | 1.37 | 7.41 | 1.48 | 0 | 26.7 | 357 | 12936 |
| 10 | 11.5% | 6.42 | 1.43 | 7.25 | 1.62 | 0.4 | 23.8 | 393 | 6273 |
| 11 | 15.4% | 6.41 | 1.47 | 7.57 | 1.74 | 0.7 | 21.3 | 358 | 6495 |
| 12 | 19.2% | 6.18 | 1.69 | 7.65 | 2.09 | 0 | 24.9 | 394 | 9000 |
| 13 | 26.9% | 5.83 | 1.81 | 7.98 | 2.48 | 0 | 20.9 | 338 | 9113 |
| 14 | 39.0% | 5.08 | 1.30 | 8.34 | 2.12 | 0 | 17.3 | 235 | 10344 |

Each of the polymerizations was carried out to a solids content of 33.8 to 35.8 wt % and the RDPS of the polymer particles ranged from 194 to 261 nm (0.194 to 0.261 micrometers). As compared to the reduction in melt viscosity of 101 Pa·s for typical FEP by itself (Comparison Example A), the core/shell polymer of the present invention exhibits a much greater melt viscosity reduction with increasing shear, with the maximum reduction occurring at the lowest core content tested. This thixotropy enables the core/shell polymer, which exhibits very low MFR, to be melt fabricated when subjected to the higher shear applied in the melt fabrication process. With respect to physical properties, the tensile strength and elongation at break of the core/shell polymer was better than for the FEP by itself at PTFE core contents up to about 30 wt %, and useful tensile strength and elongation at break exist for core contents exceeding core content of about 40 wt %. The best combination of optimum thixotropy and physical properties occur in the range of about 4 to 20 wt % PTFE core when the perfluoropolymer in the shell is FEP. The low-to-no MFR shown for the core/shell polymers in Table 1 is beneficial to the utility of articles melt-fabricated from the core/shell polymers. Such articles (dispersion of PTFE core in perfluoropolymer continuous phase obtained by melt mixing the core/shell polymer) when exposed to high heat such as in a building fire will resist flowing and dripping to thereby remain non-smoking.

Examples 15-19

Core/Shell Polymer Wherein the Shell is PFA

This Example shows the preparation of core shell polymer in which the shell is essentially the same PFA as Comparative Example E.

After 19 lbs (8618 g) TFE reacted in 114 min, the reaction was terminated by stopping TFE, initiator, and PEVE feeds, then venting the reactor. Solids content of the dispersion was 26.3 wt %, and the raw dispersion particle size (RDPS) was 0.192 μm. After coagulation, the polymer was isolated by filtering and then dried in a 150° C. convection air oven. This core/shell polymer had a melt flow rate (MFR) of 8.6 g/10 min, a PEVE content of 2.99 wt %, melting points of 301° C. and 324° C., and an MIT flex life of 5384 cycles. The copolymer also exhibited a tensile strength of 3414 psi (23.5 MPa) and elongation at break of 392%. The PTFE core content was 4.9 wt %, and $\Delta\eta$ was 2051 Pa·s. These results are included in Table 2 as Example 15. According to these results, the core/shell polymer exhibits a melt viscosity reduction of almost 20× of that of the PFA by itself and improved tensile strength and elongation at break. Examples 16 through 19 were prepared as described in Example 15. The ratio of core polymer to shell polymer was altered by changing the ratio of the TFE consumed by the first phase of the polymerization and the TFE consumed by the second phase of the polymerization. Specific details for Examples 15-19 are given in Table 2 below.

TABLE 2

| Ex. No. | PTFE Core, wt % | PEVE Content, wt % | PEVE Content in Shell, wt % | MFR, g/10 min | Tensile Strength, MPa | Elongation at Break, % | MIT Flex Life, cycles | $\Delta\eta$ Pa·s |
|---|---|---|---|---|---|---|---|---|
| 15 | 4.9% | 2.99 | 3.15 | 8.6 | 23.9 | 392 | 5384 | 2051 |
| 16 | 9.7% | 2.70 | 3.00 | 2.3 | 25.8 | 392 | 22884 | 6772 |
| 17 | 19.5% | 2.41 | 2.99 | 0.0 | 27.0 | 397 | 48748 | 15834 |
| 18 | 29.4% | 1.86 | 2.64 | 0.0 | 26.6 | 411 | 14209 | 41128 |
| 19 | 39.6% | 1.12 | 1.85 | 0.0 | 28.3 | 396 | 3752 | 3500 |

A cylindrical, horizontal, water-jacketed, paddle-stirred, stainless steel reactor having a length to diameter ratio of about 1.5 and a water capacity of 10 gallons (37.9 L) was charged with 54 pounds (24.5 kg) of demineralized water and 240 mL of a 20 wt % solution of ammonium perfluorooctanoate surfactant in water. With the reactor paddle agitated at 50 rpm, the reactor was evacuated and purged three times with tetrafluoroethylene (TFE). The reactor temperature then was increased to 75° C. After the temperature had become steady at 75° C., the pressure of the reactor was raised to 300 psig (2.1 MPa) using TFE. Four hundred milliliters of an initiating solution consisting of 0.2 wt % APS in water was injected to the reactor, then this same initiator was added at 5.0 mL/min. After polymerization had begun as indicated by a 10 psig (0.07 MPa) drop in reactor pressure, additional TFE was added at 0.2 lb (90.8 g)/min for 5 min. After 1 lb (454 g) of TFE was fed after initiation, the TFE and initiator feeds were stopped, then the reactor was slowly vented. After stopping agitation, the reactor vapor space was evacuated. Agitation was resumed at 50 rpm, then the contents were cooled to 25° C. The agitator was again stopped, then the pressure in the reactor was raised to 8 in Hg (3.93 psig, $2.71 \times 10^{-2}$ MPa) with ethane. After the addition of ethane, the agitator was restarted at 50 rpm and the contents of the reactor were warmed to 75° C. A 200 mL aliquot of perfluoro(ethyl vinyl ether) (PEVE) was added, then the pressure in the reactor was raised to 250 psig (1.75 MPa) with TFE (1.72 MPa). For the duration of the reaction, PEVE was added at 2 mL/min and initiation was resumed using the same solution at a rate of 5 mL/min. The pressure of TFE in the reactor was continuously adjusted to maintain a reaction rate of 0.167 lb TFE/min (75.7 g/min).

The polymerizations shown in Table 2 were carried out to a polymer solids content of 18.4 to 28.5 wt % and average RDPS of 184 to 192 nm. The results in Table 2 show large reductions in melt viscosity over the entire range of core/shell polymer compositions and improved tensile strength and elongation also over the entire range. Also surprising is the increase in MIT Flex Life, ranging from an increase of at least about 150% to an increase more than 2000%. Preferably the core/shell polymer in which the shell is PFA exhibits an increase in MIT Flex Life of at least 200% as compared to the PFA by itself. The PTFE/FEP core shell polymer also exhibited favorable MIT Flex Life as compared to the same FEP by itself (1100 cycles) through the range of 4 to 40 wt % PTFE core, i.e. the MIT flex life of the PTFE/FEP core shell polymer was about the same at 10 wt % PTFE core and above, while at lower PTFE content, a substantial improvement was been found to exist. For example, at 7 wt % PTFE core, the MIT Flex Life was 17000 cycles.

Example 20

This Example shows the preparation of core/shell polymer containing a very small amount of non-melt flowable PTFE.

A cylindrical, horizontal, water-jacketed, paddle-stirred, stainless steel reactor having a length to diameter ratio of about 1.5 and a water capacity of 10 gallons (37.9 L) was charged with 50 pounds (22.7 kg) of demineralized water, 5.0 g Krytox® 157 FSL (available from E.I. du Pont de Nemours and Company, Inc.), and 330 mL of a 20 wt % solution of ammonium perfluorooctanoate surfactant in water. With the reactor paddle agitated at 46 rpm, the reactor was heated to 60° C., evacuated and purged three times with tetrafluoroethylene (TFE). The reactor temperature then was increased to 103° C. After the temperature had become steady at 103° C., the pressure of the reactor was raised to 250 psig (1.75 MPa) using TFE. Fifty milliliters of an initiating solution consisting of 1.04 wt % APS and 0.94 wt % KPS in water was injected to the reactor, then this same initiator was added at 0.5 mL/min. After polymerization had begun as indicated by a 10 psig (70 kPa) drop in reactor pressure, additional TFE was added at 0.2 lb (90.7 g)/min for approximately 1 min. After 0.21 lbs (95.3 g) of TFE had been fed after initiation, the TFE feed was stopped, then the reactor contents were agitated for 10 minutes with the initiator still being fed. The agitator and initiator pumps were stopped, then the pressure of the polykettle was increased to 444 psig with HFP. The agitator was restarted and initiation was resumed using the same solution at a rate of 10 mL/min. The reactor pressure was raised to 650 psi (4.5 MPa) with TFE. An aliquot of 92 mL of PEVE was added to the reactor, then 1 mL/min PEVE and 0.2 lb (90.87 g)/min TFE were added over the remainder of the reaction. After an additional 20.79 lb (9430 g) of TFE were reacted, the TFE, initiator, and PEVE feeds were stopped, and the reactor was cooled while maintaining agitation. When the temperature of the reactor contents reached 90° C., the reactor was slowly vented. After venting to nearly atmospheric pressure, the reactor was purged with nitrogen to remove residual monomer. Upon further cooling, the dispersion was discharged from the reactor at below 70° C. After coagulation, the polymer was isolated by filtering and then drying in a 150° C. convection air oven. This polymer was stabilized by heating at 260° C. for 1.5 hr in humid air containing 13 mol % water. Solids content of the dispersion of the resultant TFE/HFP/PEVE copolymer was 39.1 wt % and raw dispersion particle size (RDPS) was 0.113 μm. The PTFE core content of this core/shell polymer was 0.87 wt %, the HFP content was 12.2 wt % in the shell, and the PEVE content was 1.06 wt % in the shell, the remainder to total 100% by weight being TFE. This material had a tensile strength of 3650 psi (25.2 MPa), an elongation at break of 370%, a melt flow rate of 14.8 g/10 min, and a viscosity reduction, Δη, of 713 Pa·s, which is much greater than for the FEP of Comparative Example A. The viscosity change at about 0.1 wt % core is estimated to be about 2 times greater than that of the FEP by itself.

Examples 22-29

This Example shows the preparation of core/shell polymer in which the core is non-melt flowable PTFE and the shell is the melt processible PFA of Polymer H, wherein the core content extends to high amounts.

A cylindrical, horizontal, water-jacketed, paddle-stirred, stainless steel reactor having a length to diameter ratio of about 1.5 and a water capacity of 10 gallons (37.9 L) was charged with 54 pounds (24.5 kg) of demineralized water and 240 mL of a 20 wt % solution of ammonium perfluorooctanoate surfactant in water. With the reactor paddle agitated at 50 rpm, the reactor was evacuated and purged three times with tetrafluoroethylene (TFE). The reactor temperature then was increased to 75° C. After the temperature had become steady at 75° C., the pressure of the reactor was raised to 300 psig (2.07 MPa) using TFE. Eighty milliliters of an initiating solution consisting of 0.2 wt % APS in water were injected into the reactor. This same initiator was then added at 5.0 mL/min. After polymerization had begun as indicated by a 10 psig (0.07 MPa) drop in reactor pressure, TFE was added at 0.2 lb (90.8 g)/min for 5 min. After 1 lb (454 g) of TFE was fed after initiation, the TFE and initiator feeds were stopped, then the reactor was slowly vented. After stopping agitation, the reactor vapor space was evacuated. Agitation was resumed at 50 rpm, then the contents were cooled to 25° C. The core has an MFR of zero at 372° C. The agitator was again stopped, then the pressure in the reactor was raised to 8 in Hg (3.93 psig, $2.71 \times 10^{-2}$ MPa) with ethane. After the addition of ethane, the agitator was restarted at 50 rpm and the contents of the reactor were warmed to 75° C. A 200 mL aliquot of perfluoro(ethyl vinyl ether) (PEVE) was added, then the pressure in the reactor was raised to 250 psig (1.75 MPa) with TFE (1.72 MPa). For the duration of the reaction, PEVE was added at 2 mL/min and initiation was resumed using the same solution at a rate of 5 mL/min. The pressure of TFE in the reactor was continuously adjusted to maintain a reaction rate of 0.167 lb TFE/min (75.7 g/min). After 19 lbs (8618 g) TFE reacted in 114 min, the reaction was terminated by stopping TFE, initiator, and PEVE feeds, then venting the reactor. Solids content of the dispersion was 30.2 wt %, and the raw dispersion particle size (RDPS) was 0.099 μm. After coagulation, the polymer was isolated by filtering and then dried in a 150° C. convection air oven. This core/shell polymer had a melt flow rate (MFR) of 4.1 g/10 min, a PEVE content of 2.93 wt %, and a 50 mil MIT flex life of 851 cycles. The core/shell polymer also exhibited a tensile strength of 4075 psi (28.1 MPa) and elongation at break of 353%. The viscosity change was 7780 Pa·s. These results are included as Example 22 in Table 3 below, along with results for additional core shell/polymers with increasing core content, wherein the core is PTFE homopolymer. The ratio of core polymer to shell polymer was altered by changing the ratio of the TFE consumed by the first phase of the polymerization and the TFE consumed by the second phase of the polymerization. Tensile strength and elongation at break were measured both on compression molded plaques by the procedure disclosed under Test Procedures and on strands extruded by the Kayeness capillary rheometer described under Test Procedures operating at 350° C. and 4 s$^{-1}$.

TABLE 3

| Comparative Ex. No. | PTFE Core, wt % | PEVE Content, wt % | PEVE Content in Shell, wt % | MFR, g/10 min | Tensile Strength, MPa plaque | Elongation at Break, % plaque | 1.27 mm MIT Flex Life, cycles | Δη Pa · s | Tensile Strength, MPa strand | Elongation at Break, % strand |
|---|---|---|---|---|---|---|---|---|---|---|
| 22 | 4.85 | 2.93 | 3.08 | 4.12 | 28.1 | 353 | 851 | 7780 | 29.2 | 519 |
| 23 | 9.71 | 2.85 | 3.16 | 3.34 | 28.3 | 353 | 1016 | 8667 | 27.2 | 487 |
| 24 | 19.51 | 2.45 | 3.04 | 0 | 28.4 | 372 | 1796 | 9533 | 30.1 | 334 |
| 25 | 29.4 | 2 | 2.83 | 0 | 28.7 | 384 | 2560 | 5180 | 16.7 | 72 |
| 26 | 49.33 | 1.35 | 2.66 | 0 | 22 | 275 | 2070 | 19283 | 31.3 | 559 |
| 27 | 59.27 | 1.21 | 2.98 | 0 | 20.4 | 298 | 460 | (1) | (1) | (1) |
| 28 | 74.42 | 0.77 | 3 | 0 | 16.6 | 219 | 233 | 16500 | 18.5 | 153 |
| 29 | 89.76 | 0.28 | 2.61 | 0 | 15.5 | 96 | 116 | 17237 | 8.7 | 46 |

(1) not measured

To shorten the time for MIT Flex Life testing the testing reported in Table 3 was done on 1.27 mm thick compression molded films, which gives a much smaller MIT Flex Life, which would be much larger if the testing were done on 0.21 mm thick films. As shown in Table 3, as the core content for the PTFE homopolymer core increase to about 75 wt %, the tensile properties are still reasonably significant to have value. For example at about 75 wt % core content, elongation is still above 200%. The tensile properties of the melt extruded strand are also reasonably high to have value.

Example 30

This Example is directed to improved injection molding and resulting from the use of the polymer mixture used in the present invention, wherein the mixture is supplied by core/shell polymer.

PFA 1 used in this Example is a copolymer of tetrafluoroethylene (TFE) and perfluoro(propyl vinyl ether) (PPVE), with PPVE content of 4.1 wt %, and MFR of 29.2 g/10 min.

PFA 2 used in this Example is the same copolymer as PFA 1 except that the PPVE content of 4.2 wt %, and the MFR is 12.6 g/10 min.

State 1 is a core/shell polymer having 4.78 wt % polytetrafluoroethylene core and a PFA shell of composition like that of PFA 1. State 1 MFR is 8 g/10 min.

State 2 is a core/shell polymer having 4.81 wt % polytetrafluoroethylene (PTFE) core and a PFA shell of composition like that of PFA 2. State 2 has an MFR of 4 g/10 min.

Test Procedures for this Example

Flex Life—The procedure for measuring MIT Flex Life is in accordance with ASTM D 2176, and the MIT Flex Life values reported in this Example were measured on a 50 mil (1.27 mm) thick film compression molded in the same way as disclosed under Test Procedures at the beginning of the Examples for the compression molding of 60 mil (1.5 mm) thick plaque, except that the thickness of the chase to mold the 1.27 mm thick film was 50 mils (1.27 mm) thick. Use of the thicker film (thicker than the 0.21 mm thick film in the preceding Examples) shortens the time required in the flex test, thereby resulting in much smaller MIT flex life numbers (cycles). The MIT Flex Life determined on the 1.27 mm thick film can be described as the 1.27 mm MIT Flex Life.

Injection Moldability—The "snake flow" test measures the flowability of polymer at shear rates typical of those used in injection molding. A molten polymer sample was injected into a mold having a rectangular channel 12.7 mm by 2.54 mm, the channel being serpentine in shape. The distance that injected polymer travels in the channel is an index of polymer melt flowability. For convenience, the weight of the polymer in the channel ("Shot Weight") is reported.

The equipment used was a Nissei Injection Molding Machine, Model FN-4000. Temperature profile: rear 350° C., Center 350° C.; Front 355° C.; Nozzle 360° C.; mold temperature 180° C.; injection pressures 80 MPa and 120 MPa.

Injection Molding

The core/shell polymers, State 1 and State 2 are compared with PFA 1 and PFA 2 at injection pressure of 80 MPa. State 2 and PFA 2 are also compared at 120 MPa. Tables 4 and 5 summarize the results for injection pressures of 80 MPa and 120 MPa respectively.

TABLE 4

| | Injection Pressure 80 MPa | | | |
|---|---|---|---|---|
| Polymer | PFA 1 | State 1 | PFA 2 | State 2 |
| MFR | 29.2 | 8 | 12.6 | 4 |
| Shot Wt. (g) | 9.6 | 9.0 | 6.0 | 4.5 |

TABLE 5

| | Injection Pressure 120 MPa | |
|---|---|---|
| Polymer | PFA 2 | State 2 |
| MFR | 12.6 | 4 |
| Shot Wt. (g) | 13.1 | 12.7 |

The results show that the core/shell polymers of the invention have melt flowability under injection molding conditions much higher than would be predicted from their low MFR, thus exhibiting the shear thinning (thixotropic) behavior of core/shell polymer of the present invention. One aspect of the importance of being able to obtain high shot weight with low MFR core/shell polymer is shown by the flex life test results.

The 1.27 mm MIT Flex Life was measured on State 1 and State 2 core/shell polymers of the invention and on PFA 1 and PFA 2. Results are summarized in Table 6.

TABLE 6

| Polymer | PFA 1 | State 1 | PFA 2 | State 2 |
|---|---|---|---|---|
| MFR | 29.2 | 8 | 12.6 | 4 |
| Flex Life (cycles) | 139 | 362 | 418[(1)] | 880 |

[(1)]The MIT flex life for 8 mil (0.21 mm) thick film of PFA 2 is about 15,000 cycles.

The flex life test results show that States 1 and 2 core/shell polymer, while behaving like polymers of much higher melt flow rate in melt processing, also behave like polymers of low melt flow rate by exhibiting high MIT Flex Life.

What is claimed is:

1. A process for melt fabricating perfluoropolymer, comprising forming a mixture of submicrometer-size particles (A) of non-melt-flowable polytetrafluoroethylene having a melt creep viscosity of at least $1 \times 10^6$ Pa·s at 380° C. and submicrometer-size particles (B) of melt-fabricable perfluoropolymer having a melt flow rate of at least 0.1 g/10 min at 372° C. as measured in accordance with Table 2 of ASTM D-1238-94a by mixing together an aqueous dispersion of said submicrometer-size particles (A) of non-melt flowable polytetrafluoroethylene and an aqueous dispersion of said submicrometer-size particles (B) of melt-fabricable perfluoropolymer, separating the resultant mixture of said submicrometer-size particles (A) of non-melt flowable polytetrafluoroethylene and said submicrometer-size particles (B) of melt-fabricable perfluoropolymer from the resultant mixture of said aqueous dispersions, melt blending said resultant mixture of said submicrometer-size particles (A) of non-melt flowable polytetrafluoroethylene and said submicrometer-size particles (B) of melt-fabricable perfluoropolymer to form a melt blended mixture comprising dispersion of said submicrometer-size particles of non-melt flowable polytetrafluoroethylene in a continuous phase of said melt-fabricable perfluoropolymer, molding the resultant melt blended mixture into an article, and wherein said non-melt flowable polytetrafluoroethylene constitutes at about 4 to 40 wt % of the combined weight of said non-melt-flowable polytetrafluoroethylene and said melt-fabricable perfluoropolymer.

2. The process of claim 1 wherein said melt blending and molding is done by injection molding.

3. The process of claim 1 wherein said non-melt flowable polytetrafluoroethylene is modified polytetrafluoroethylene.

4. The process of claim 1 wherein said melt-fabricable perfluoropolymer is a copolymer of tetrafluoroethylene and perfluoro(alkyl vinyl ether) wherein the alkyl group contains 1 to 5 carbon atoms.

5. The process of claim 1 wherein said non-melt flowable polytetrafluoroethylene is modified polytetrafluoroethylene and said melt-fabricable perfluoropolymer is a copolymer of tetrafluoroethylene and perfluoro(alkyl vinyl ether) wherein the alkyl group contains 1 to 5 carbon atoms.

6. The process of claim 1 wherein said melt-fabricable perfluoropolymer is a copolymer of tetrafluoroethylene and hexafluoropropylene and the amount thereof is 7 to 40 wt % of the combined weight of said non-melt-flowable polytetrafluoroethylene and said copolymer of tetrafluoroethylene and hexafluoropropylene.

7. The process of claim 1 wherein the particle size of said particles of non-melt fabricable polytetrafluoroethylene and said melt-fabricable perfluoropolymer is less than 0.3 micrometers.

8. The process of claim 1 wherein said separating consists essentially of co-coagulating said mixed-together aqueous dispersions and drying the resultant mixture of submicrometer-size particles.

9. The process of claim 1 wherein the mixture of submicrometer-size particles of non-melt-flowable polytetrafluoroethylene and melt-fabricable perfluoropolymer is characterized by a reduction in melt viscosity upon increasing shear rate from about
  $10\ s^{-1}$ to about $100\ s^{-1}$ that is at least 100% greater than the reduction in melt viscosity at the same shear rates for the melt-fabricable perfluoropolymer by itself, as determined by the capillary rheometer method.

10. The process of claim 1 wherein the melt blended mixture of submicrometer-size particles of non-melt-flowable polytetrafluoroethylene and melt-fabricable perfluoropolymer is characterized by an elongation of at least 200% when said particles of non-melt flowable polytetrafluoroethylene constitute at least 4 wt % of the combined weight of said particles of non-melt-flowable polytetrafluoroethylene and said melt-fabricable perfluoropolymer.

11. The process of claim 1 wherein said molding is carried out by melt extrusion.

12. The process of claim 9 wherein said melt extrusion forms pellets.

* * * * *